UNITED STATES PATENT OFFICE.

JOHN E. KLEBER, OF CORYDON, INDIANA.

IMPROVEMENT IN MEDICAL COMPOUNDS.

Specification forming part of Letters Patent No. 215,135, dated May 6, 1879; application filed February 25, 1879.

*To all whom it may concern:*

Be it known that I, JOHN E. KLEBER, of Corydon, in the county of Harrison and State of Indiana, have invented certain new and useful Improvements in Medicinal Compounds for the Cure of Diseases in Horses; and I do hereby declare the following to be a full, clear, and exact description of the invention, such as will enable others skilled in the art to which it pertains to make and use it.

My invention relates to an improvement in medicines for the cure of diseases in horses; and it consists in the use of certain ingredients that are enumerated below, whereby diseases in horses arising from inflammation of any kind, the derangements of the organic forces, the bots, and mad staggers may be cured or greatly relieved in a very short time.

In preparing my compound, I take of salt, one pint; water, one and one-half pint; bi-carbonate of soda, one ounce; spirits of niter, one ounce; white vitriol, (sulphate of zinc,) one-fourth ounce; white antimony, (tartar emetic,) one-eighth ounce.

The different ingredients are mixed together and left to stand until they have become thoroughly dissolved and mixed.

The dose is first one pint, and if relief is not given in ten minutes, a second dose of one pint is given.

This medicine is given for the cure of colic, bots, mad staggers, acute pneumonia, overheat, derangements of the organic forces, inflammation and congestion of the lungs, and all diseases arising from inflammation.

Having thus described my invention, I claim—

A medicine for the treatment of diseases in horses, composed of salt, water, bicarbonate of soda, spirits of niter, white vitriol, (sulphate of zinc,) and white antimony, (tartar emetic,) in or about the proportions set forth.

In testimony that I claim the foregoing I have hereunto set my hand this 18th day of February, 1879.

JOHN E. KLEBER.

Witnesses:
SILAS CRAYDEN,
JOHN B. WILLETT.